(12) United States Patent
Disser

(10) Patent No.: US 8,157,660 B2
(45) Date of Patent: Apr. 17, 2012

(54) ROLLING-SLIDING UNIT AND JOINTED SHAFT COMPRISING THE SAME

(75) Inventor: Claus Disser, Seligenstadt (DE)

(73) Assignees: Shaft-Form-Engineering GmbH, Muehlheim (DE); BF New Technologies GmbH, Muehlheim (DE)

( * ) Notice: Subject to any disclaimer, the term of this patent is extended or adjusted under 35 U.S.C. 154(b) by 38 days.

(21) Appl. No.: 12/693,118

(22) Filed: Jan. 25, 2010

(65) Prior Publication Data

US 2010/0124995 A1     May 20, 2010

Related U.S. Application Data

(63) Continuation of application No. PCT/DE2008/001107, filed on Jul. 2, 2008.

(30) Foreign Application Priority Data

Jul. 26, 2007   (DE) .......................... 10 2007 035 468

(51) Int. Cl.
  *F16C 3/03*      (2006.01)
  *F16D 3/06*      (2006.01)
(52) U.S. Cl. ..................................... 464/167
(58) Field of Classification Search .............. 464/146, 464/167, 169, 183, 906, 173–175; 74/493; 280/775, 777; 384/49, 51
See application file for complete search history.

(56) References Cited

U.S. PATENT DOCUMENTS

| | | | |
|---|---|---|---|
| 1,791,001 A * | 2/1931 | Rasmussen | 74/493 |
| 2,227,821 A * | 1/1941 | Burrell | 74/493 |
| 2,883,877 A * | 4/1959 | McGavock | 74/493 |
| 3,325,837 A * | 6/1967 | Hartmann | 464/167 |
| 4,103,514 A * | 8/1978 | Grosse-Entrup | 464/167 |
| 4,107,949 A * | 8/1978 | Wanner et al. | 464/167 |
| 4,236,388 A * | 12/1980 | Geisthoff | 464/167 |
| 4,338,797 A * | 7/1982 | Herchenbach | 464/167 |
| 4,384,861 A * | 5/1983 | Lange et al. | 464/168 |
| 5,651,738 A * | 7/1997 | Jacob et al. | 464/167 |
| 6,254,487 B1 * | 7/2001 | Jacob | 464/167 |
| 6,585,601 B2 * | 7/2003 | Booker et al. | 464/167 |

(Continued)

FOREIGN PATENT DOCUMENTS

DE       29 41 065 A1    4/1981

(Continued)

OTHER PUBLICATIONS

International Search Report dated Jan. 22, 2009 with English translation (Four (4) pages).

*Primary Examiner* — Gregory Binda
*Assistant Examiner* — Josh Skroupa
(74) *Attorney, Agent, or Firm* — Crowell & Moring LLP

(57) ABSTRACT

A rolling-sliding unit, particularly for a jointed shaft, including a profiled sleeve (4) having outer raceways on an interior surface thereof; a journal (5) which is displaceable in the profiled sleeve (4) and which has inner raceways on an exterior surface thereof, and balls (9) in the raceways between the profiled sleeve and the journal for transmitting torque. A cover is provided on the journal of the rolling-sliding unit and an elastic element is arranged between the profiled sleeve and the journal of the rolling-sliding unit. A jointed shaft comprising a rolling-sliding unit of the described type also is described.

5 Claims, 1 Drawing Sheet

U.S. PATENT DOCUMENTS

| | | | |
|---|---|---|---|
| 7,226,360 B2 * | 6/2007 | Lyon et al. | 464/167 |
| 7,607,676 B1 * | 10/2009 | Chu | 464/167 |
| 2005/0233812 A1 * | 10/2005 | Wang et al. | 464/175 |
| 2006/0060022 A1 * | 3/2006 | Yamada | 74/492 |
| 2006/0162989 A1 * | 7/2006 | Yamada | 180/444 |
| 2007/0021223 A1 * | 1/2007 | Kossack et al. | 464/167 |
| 2008/0248886 A1 | 10/2008 | Disser et al. | |

FOREIGN PATENT DOCUMENTS

| | | |
|---|---|---|
| EP | 1 553 005 A1 | 7/2005 |
| GB | 2 060 137 A | 4/1981 |
| WO | WO 2007/036343 A1 | 4/2007 |

* cited by examiner

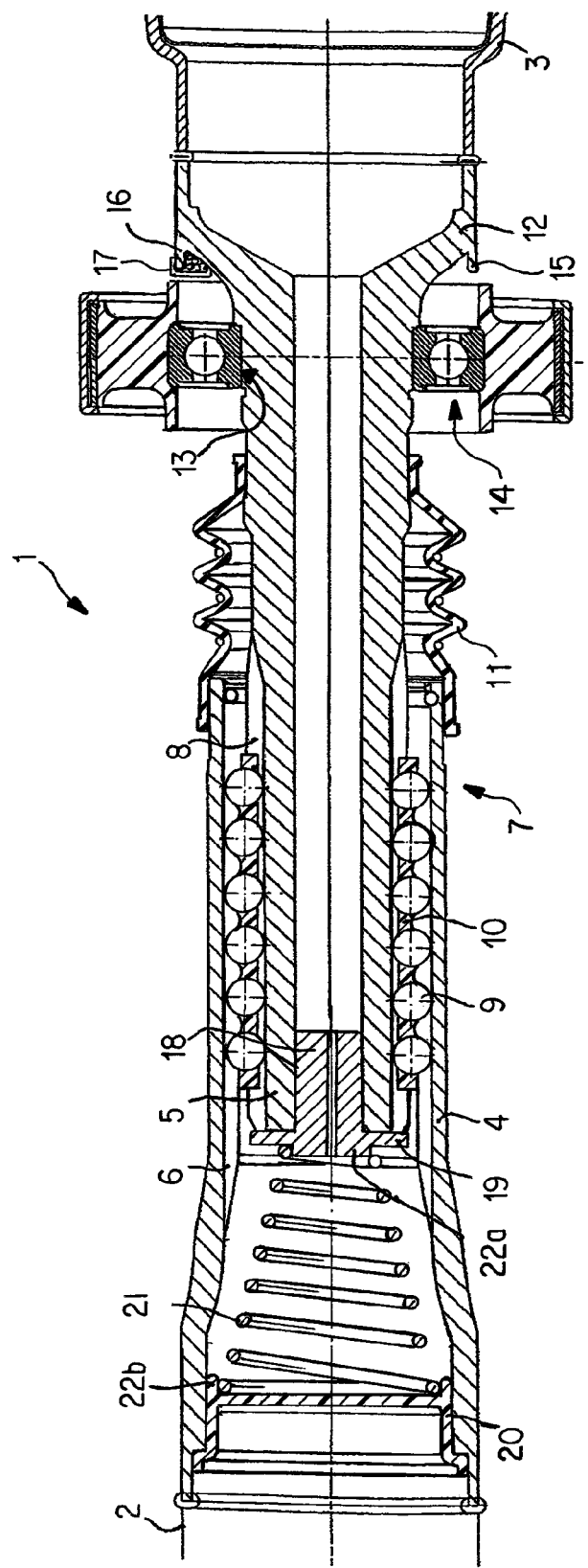

ROLLING-SLIDING UNIT AND JOINTED SHAFT COMPRISING THE SAME

CROSS REFERENCE TO RELATED APPLICATIONS

This application is a continuation of international patent application no. PCT/DE2008/001107, filed Jul. 2, 2008, designating the United States of America and published in German on Jan. 29, 2009 as WO 2009,012746, the entire disclosure of which is incorporated herein by reference. Priority is claimed based on Federal Republic of Germany patent application no. DE 10 2007 035 468.3, filed Jul. 26, 2007.

BACKGROUND OF THE INVENTION

The invention relates to a rolling-sliding unit comprising a profiled sleeve, on the internal surface of which outer raceways are provided at least at certain sites, and having a journal which is movable in the axial direction in said profiled sleeve, on the external surface of which inner raceways are provided at least at certain sites, and having balls which, for torque transmission, are arranged in mutually assigned paired outer raceways and inner raceways. The invention also relates to a jointed shaft with a rolling-sliding unit of this type.

In conventional rolling-sliding units of the aforementioned type, which are often used in jointed shafts, the danger exists that before installation in a vehicle, for example, during transportation, shaking occurs and causes abrupt extension or retraction of the journal relative to the profiled sleeve. This can lead to damage to the components of the rolling-sliding unit and such damage might not be noticeable until later.

It is also known with conventional rolling-sliding units of the aforementioned type to limit the maximum permissible travel by which the journal is displaceable relative to the profiled sleeve in that securing rings or the like are provided in the inner raceways and/or the outer raceways. The maximum displacement travel is therefore limited in that the balls and/or a cage which may be provided make(s) contact with a securing ring of this type. It is herein considered to be disadvantageous that the raceways, which are relatively expensive to produce, are shortened by securing rings or the like. In the interests of saving weight, it is preferable to make the journal as short as possible so that the raceways do not have to be extended unnecessarily.

SUMMARY OF THE INVENTION

It is therefore an object of the present invention to provide an improved rolling-sliding unit and jointed shaft of the aforementioned type.

Another object of the invention is to provide a rolling-sliding unit and a jointed shaft which are economical to manufacture.

A further object of the invention is to provide a rolling-sliding unit and a jointed shaft which ensure a high level of operational reliability.

These and other objects have been achieved in accordance with the present invention in a rolling-sliding unit of the aforementioned type essentially in that, at the end of the journal that is introducible into the profiled sleeve, a cover is provided such that at least a section of the cover extends radially outwardly as far as the region of at least one of the outer raceways. It is thereby possible to utilize the full length of the outer raceways of the journal during operation for rolling displacement of the balls at least in one displacement direction of the rolling-sliding unit. The cover merely prevents the balls from being able to fall out of the raceways. It is therefore not necessary to extend the raceways in order to merely be able to provide a collapsing stop or an extension stop.

It has been unexpectedly found that the provision of the cover on the journal is associated with a further substantial advantage. According to the invention, the cover can be adapted to the maximum displacement length of the rolling-sliding unit occurring during operation so that, in the maximum collapsed position the cover makes contact against a further stop also configured as a cover within the profiled sleeve. In the known rolling-sliding units, the forces acting exclusively on the balls, the cage and/or the raceways or their stops during sudden collapsing or extension of the journal relative to the profiled sleeve can also be absorbed by the cover in this way.

It is preferred to make the cover from an optionally slightly flexible material, such as synthetic resin (i.e., plastic). In order to achieve sufficient strength in the cover, it is preferred to make the cover from a fiber composite material, for example, glass fiber and/or carbon-fiber reinforced plastics.

According to one preferred embodiment of the invention, in order to hold the cover securely on the journal, the journal is provided, at least on the end thereof which can be introduced into the profiled sleeve, with a central opening, and the cover has a projection which can be secured in the opening. In order to save weight, the opening of the journal can also be configured as a through opening so that the journal also may have an essentially sleeve-shaped configuration.

The projection of the cover can either have a geometry corresponding to the geometry of the opening in the journal or a geometry differing therefrom, which must, however, enable alignment and fastening of the cover on the journal. The projection can be pressed, snap-locked or glued into the opening and/or held in the opening by a spring or the like.

If the cover has, in particular, a cylindrical flange, the radially outer edge of which closes the outer raceways at least at certain sites in the axial direction, the balls or the cage accommodating the balls are reliably prevented from falling out without reducing the usable length of the raceways.

A particularly secure connection of the cover to the journal can be achieved if the cover comprises at least one projection engaging in one of the outer raceways. In order to connect the cover to the journal, the at least one projection of the cover can be secured in at least one of the outer raceways. This can also be carried out by clamping, gluing, snap-locking or elastic pressing-on. Alternatively, the cover also may comprise a radially outer edge, which is pushed, at certain sites, over the web region between the outer raceways of the journal. The edge region of the cover can be clamped, glued or snap-locked into a groove there.

In accordance with one preferred embodiment of the invention, an elastic element is provided between the profiled sleeve and the journal such that the journal is impinged upon by the elastic element in a direction urging the journal out of the profiled sleeve. In addition to the provision of the cover, this also prevents the profiled sleeve and the journal from moving suddenly relative to one another, so that damage to the rolling-sliding unit can be prevented. It is also advantageous for jointed shafts, in which rolling-sliding units of this type are often utilized, to sometimes be equipped with plug-in connections in which two components to be connected to one another are inserted into one another and snap-locked there. Due to the provision of a spring or the like between the journal and the profiled sleeve of the rolling-sliding unit, these plugged-together components are urged in the direction of the mutually engaged position thereof, so that locking into place is made easier and unintentional release during operation can be prevented.

In a refinement of the inventive concept, a device for supporting an elastic element is provided in and/or on the profiled sleeve. Thus covers are frequently utilized in the profiled sleeve and/or a shaft section adjacent thereto, which prevents the leakage of lubricant. An additional cover of this type in the profiled sleeve can constitute a structure for supporting a spring or a spring arrangement. Alternatively, it is also possible to provide projections or the like on the inside of the profiled sleeve, against which an elastic element can be supported.

In the same way, an elastic element is preferably provided in and/or on the cover for supporting an elastic element. The flange of the cover can serve to support a spring, in particular a helical spring, or alternatively or additionally, a spigot-like projection, which holds a spring centered, can also be provided on the cover.

The objects of the invention are also achieved by the provision of a jointed shaft which comprises two shaft sections which are connected to one another in rotationally secured manner via a central joint configured as a fixed-type constant velocity joint, wherein a fixed-type constant velocity joint is arranged on the end of each shaft section facing away from the central joint, and wherein the jointed shaft also comprises at least one rolling-sliding unit, particularly arranged close to the central joint, said rolling-sliding unit being length-adjustable in the axial direction between a collapsed position and an extended position, wherein at least one elastic element is provided between the profiled sleeve of the rolling-sliding unit and the journal of the rolling-sliding unit such that the rolling-sliding unit is urged into the extended position thereof.

The elastic element, which is configured, for example, as a compression spring, prevents unwanted relative movement of the components of the rolling-sliding unit both during operation and, in particular, during transportation and assembly before installation and can also be used to hold other components of the jointed shaft in a condition connected to one another in rotationally secured manner.

In a further development of the inventive concept, at least one of the shaft sections and/or a joint connectable thereto can be connected via a plug-in connection to a driving or driven component. It is particularly preferred if the plug-in connection comprises two components which can be inserted into one another and are each provided with corresponding longitudinal teeth, with the components being fixable relative to one another in the axial direction via a locking device, for example, a securing ring. The pre-tension of the rolling-sliding unit within the jointed shaft has the effect that the components of the jointed shaft that can be plugged into one another remain securely connected to one another during operation without any danger of the locking device or similar connection becoming released.

The present invention comprises all the features described and/or illustrated in the application, either individually or in any combination, regardless of whether they are claimed together in any of the claims or in claims which depend directly or indirectly from each other.

BRIEF DESCRIPTION OF THE DRAWINGS

The invention will be described in greater detail hereinafter with reference to illustrative embodiments depicted in the accompanying drawing FIGURE, which is a schematic sectional view through a region of a jointed shaft according to the invention.

DETAILED DESCRIPTION OF PREFERRED EMBODIMENTS

The section of a jointed shaft 1 shown in the FIGURE comprises a first shaft section which is constructed from a tubular shaft 2 and a second shaft section (not shown in the FIGURE), wherein the two shaft sections are connected to one another in rotationally secured manner via a central joint. In the FIGURE, only one section of the external drive hub 3 of the central joint is shown.

In the embodiment shown, the tubular shaft 2 is welded to a profiled sleeve 4, which is a component of a rolling-sliding unit. Accommodated displaceably in the profiled sleeve 4 is a journal 5, which is welded to the external driving hub 3 of the central joint. Outer raceways 6 are provided at certain sites on the internal surface of the profiled sleeve 4, while inner raceways 8 are provided in a displacement region 7 of the journal 5.

The outer raceways 6 and the inner raceways 8 extend parallel to one another and are associated with one another in pairs. Accommodated in each pair made up from an outer raceway 6 and an inner raceway 8 are a plurality of balls 9 such that said balls can roll along the raceway pairs. The balls 9 are guided in the axial direction in a sleeve-shaped cage 10. Due to the balls 9 arranged in the outer raceways 6 and the inner raceways 8, a torque can be transmitted from the profiled sleeve 4 to the journal 5, whereas the profiled sleeve 4 and the journal 5 can easily be displaced relative to one another in the axial direction. The profiled sleeve 4 is sealed via a folding bellows 11, so as to be movable in the axial direction relative to the journal 5.

Adjacent the displacement region 7, the journal 5 has a connecting region 12 which is widened relative the displacement region. This connecting region 12 is welded to the tubular end of the external drive hub 3 of the central joint. Adjacent the connecting region 12 on the displacement region 7, which has a smaller diameter than the connecting region 12, a bearing seat 13 is provided for a roller bearing 14 which is elastically mounted in the embodiment shown.

The connecting region 12 of the journal 5, which is essentially provided with a cylindrical outer contour, has a ring-shaped projection 15, which is provided adjacent to the roller bearing 14 and faces in the direction toward the displacement region 7. The ring-shaped projection 15 is configured so that between the outer surface of the displacement region 7 and the radially inner surface of the projection 15, a ring-shaped intermediate space remains. This intermediate space serves to accommodate a balancing weight 16 which is fixed via a clip 17 to the projection 15. The balancing weight 16 can also be glued or welded onto the radially inner side of the projection 15.

The annular projection 15 forms, together with the remaining connecting region 12, a common, essentially cylindrical outer contour. This is suitable for accommodating an additional balancing weight (not shown in the FIGURE), which can be configured, for example, as a strip of metal which can be welded on.

On the side facing away from the connecting region 12, the journal 5 is closed with a cover 18 which is inserted into the central bore or opening of the journal 5 with, for example, a cylindrical section. The cover 18 has a flange region 19, which extends radially outward at least as far as the inner raceways 8, so that the flange 19 can prevent the balls 9 or the cage 10 from falling out.

In the illustrated embodiment, a helical spring 21 is provided between a further cover 20, which is provided in the profiled sleeve 4, and the cover 18 inserted into the journal 5. The spring 21 which is supported against both covers 18 and 20 therefore urges the journal 5 toward the right in the FIGURE, i.e., into the extended position in which the journal 5 is pushed out of the profiled sleeve 4.

The spring 21 can serve, first, to lock into place a connection (not shown in the FIGURE) of the central joint on the second shaft section and, second, to ensure that the journal 5 and the profiled sleeve 4 are not freely displaceable relative to one another before installation, that is, during transportation and assembly, in order to prevent damage from sudden collapsing or extension of the journal 5 into or out of the profiled sleeve.

In order to accommodate the compression spring 21, which can optionally also be configured as a stack of disk springs or another appropriate elastic element, suitable retaining projections 22a, 22b are provided both on the cover 18 of the journal 5 and on the cover 20 of the profiled sleeve 4. In the embodiment shown, the spring 21 is configured as a helical spring, so that the cover 18 with the projection 22a can rest against the cover 20, while the spring 21 is accommodated in space-saving manner between the projections 22a and 22b.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A rolling-sliding unit comprising:
   a profiled sleeve having an internal surface on which outer raceways are provided at least at certain sites;
   a journal having an end which is introducible into and movable in the axial direction in said profiled sleeve, said journal having an external surface on which inner raceways are provided at least at certain sites, and an opposite end connected to a tubular end of an external drive hub of a joint, and
   balls which are arranged for transmitting torque in mutually associated pairs of said outer raceways and inner raceways and which are guided in a sleeve-shaped cage;
   wherein
   the journal moves in the profiled sleeve to adjust an axial position of the journal relative to the profiled sleeve as needed to accommodate axial displacements of the rolling-sliding unit,
   at the end of the journal that is introducible into the profiled sleeve, a cover is provided such that at least a section of the cover extends radially outwardly as far as the region of at least one of the outer raceways,
   in said profiled sleeve a further cover is provided,
   an elastic element is provided between said profiled sleeve and said journal such that said journal is contacted by said elastic element and urged in a direction out of said profiled sleeve,
   said elastic element is provided between said cover and said further cover,
   retaining projections are provided both on said cover and said further cover which serve as supports for said elastic element, and
   a bellows seal is provided between the journal and the profiled sleeve.

2. A rolling-sliding unit as claimed in claim 1, wherein at least the end of the journal which can be introduced into the profiled sleeve is provided with a central opening, and the cover has a projection which can be secured in said opening.

3. A rolling-sliding unit as claimed in claim 1, wherein the cover has a cylindrical flange with a radially outer edge which closes the outer raceways at least at certain sites in the axial direction.

4. A rolling-sliding unit as claimed in claim 1, wherein the cover comprises at least one projection which engages in one of the outer raceways.

5. A rolling-sliding unit as claimed in claim 4, wherein said at least one projection of the cover is secured in said one of the outer raceways.

* * * * *